Feb. 6, 1945.    F. MARTIN ET AL    2,368,939
PRODUCTION OF LIQUID FUEL
Filed Jan. 22, 1936
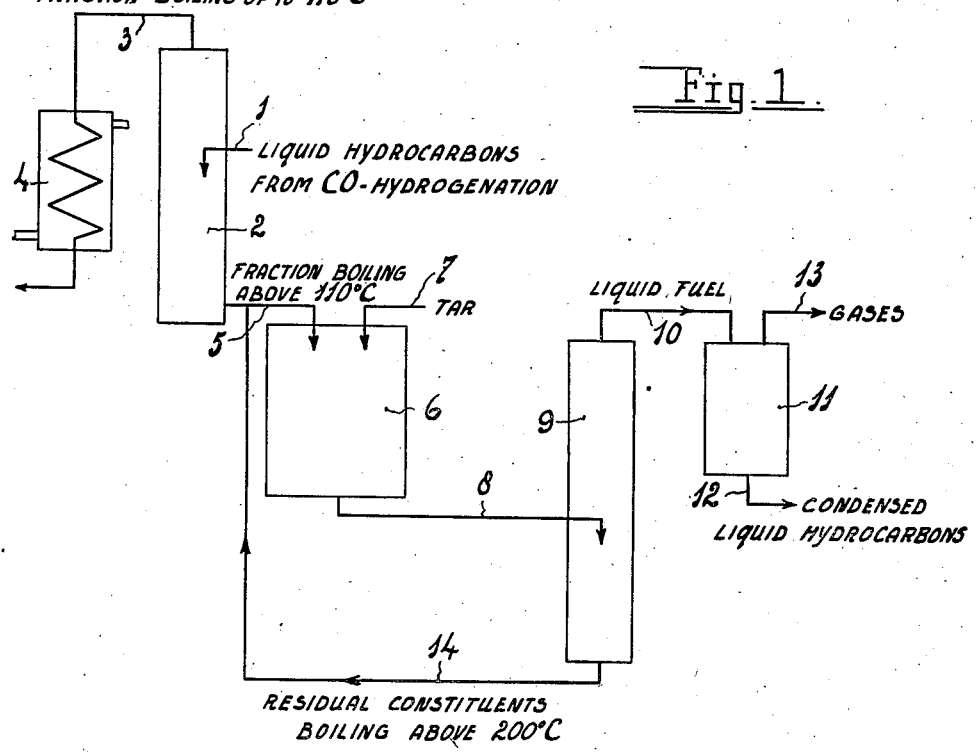
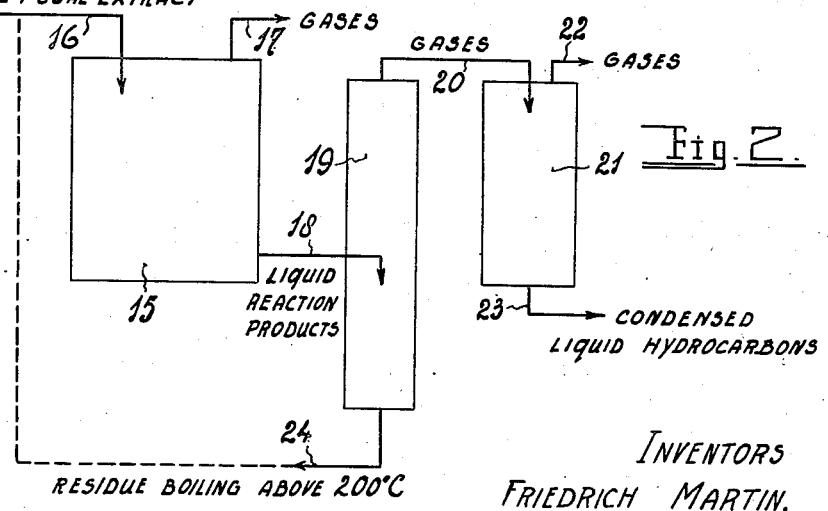
INVENTORS
FRIEDRICH MARTIN,
HEINRICH TRAMM
BY
ATTY Patented Feb. 6, 1945

2,368,939

UNITED STATES PATENT OFFICE 2,368,939

PRODUCTION OF LIQUID FUEL

Friedrich Martin, Oberhausen, and Heinrich Tramm, Oberhausen-Holten, Germany; vested in the Alien Property Custodian Application January 22, 1936, Serial No. 60,192
In Germany January 28, 1935

1 Claim. (Cl. 196—50)

Our invention relates to the production of products fit for use as liquid fuel for internal combustion engines and for similar purposes. It has particular reference to a process whereby mixtures of hydrocarbons can be converted into readily volatile, low boiling and inflammable hydrocarbons of the gasoline type.

As is well known to those skilled in the art, in order to produce liquid fuel for internal combustion engines, mixtures of hydrocarbons poor in hydrogen with other hydrocarbons rich in hydrogen have been heat-treated with the result that hydrocarbons of lower boiling point were obtained.

One has also reacted carbon monoxide with hydrogen, the product being a mixture of hydrocarbons rich in hydrogen, which, being little knocking-proof, are not particularly suitable for use as liquid fuel without having previously undergone a further chemical treatment.

It has therefore been tried to subject these products rich in hydrogen, or fractions of same, to a heat treatment wherein a fuel is obtained with an octane value, (see the article by A. L. Forster in National Petroleum News 23 (1941) No. 24, p. 30), not exceeding 63, the knocking-proofness of which is not satisfactory at all.

On the other hand this treatment causes considerable quantities of free hydrogen as well as hydrogen combined under the form of gaseous hydrocarbons, such as methane, ethane, ethylene etc. to be split off, which are thus lost for the production of liquid fuel.

We have now found that it is possible to produce liquid fuel having a satisfactory octane value if the mixtures of hydrocarbons resulting in the reaction of carbon oxides (CO or $CO_2$) with hydrogen, or fractions of such mixtures which are particularly rich in hydrogen, are subjected together with mixtures of hydrocarbons poor in hydrogen to a suitable heat treatment.

We have found that the considerable losses in hydrogen and gaseous hydrocarbons encountered, when merely heat-treating the reaction products from the carbon oxide conversion process, which are rich in hydrogen, are greatly reduced in our process, so that a far greater yield of liquid fuel, calculated on the whole of the hydrocarbons subjected to reaction, is obtained, this fuel possessing also a considerably higher knocking-proofness.

As mixtures of hydrocarbons poor in hydrogen, we may use bituminous substances such as tars, mineral oils poor in hydrogen, emulsions of mineral or brown-coal, pitch-coal etc., and with particular advantage bituminous constituents of mineral coal or brown-coal, which are very poor in hydrogen and are freed, partly or altogether from the ashes, for instance by extracting the bituminous substances or by subjecting same to a slight hydrogenation treatment, wherein the bituminous substances are liquefied at the temperatures of reaction and are thereafter separated from the ashy constituents.

Such a bituminous product free from ashes may for instance contain 0.1% ashes and 39.10% volatile constituents, its upper heating value being 8897 heat units/kg., its softening temperature about 231° C.

Here also operation at a pressure above normal has been found preferable.

If, in order to prepare another kind of carbonaceous material poor in hydrogen, such as brown-coal, mineral coal, coal emulsions, tars and the like for use as a starting material in our process, the material is subjected to hydrogenation with hydrogen gas, the hydrogenation is preferably carried through in a two-stage process. In the first stage the highly viscous or liquid starting products are treated at temperatures of about 400° C. or above with hydrogen under high pressure ranging for instance between 100 and 300 atmospheres, in the presence of catalysts insensitive to the action of sulfur, such as compounds of molybdenum, tungsten and metals of the fourth, fifth and sixth groups of the periodic system, more especially the oxides, sulfides, carbonyls, phosphates and sulfates of these metals, which may be distributed on carriers such as silica gel, active carbon, pottery fragments, magnesia, alumina and the like.

We have further found that the products obtained in the first stage of the hydrogenation process can be reacted advantageously with the hydrocarbons obtained when reacting carbon monoxide or carbon dioxide with hydrogen, for the production of valuable knocking-proof liquid fuels.

In practising our process, we subject the heavy oils resulting in the first hydrogenation stage, together with the products resulting in the reaction of hydrogen with a carbon oxide, to distillation, preferably under pressure in the presence of suitable catalysts of the kind aforesaid.

The mixtures of hydrocarbons poor in hydrogen may also be replaced by mixtures of the substances hereinbefore mentioned.

All the reactions occurring in the process according to this invention are preferably carried through in the presence of hydrogenation catalysts insensitive against sulfur poisoning, such as the sulfides of molybdenum and tungsten.

The reaction temperature in the process according to the invention may vary between about 300 and 700° C. and operation at 400–650° C. under a pressure above normal, for instance 60 or 80 atmospheres, has been found to be particularly suitable. The intended conversion between the products poor in hydrogen and the benzine hydrocarbons rich in hydrogen starts proceeding appreciably at temperatures above 300° C. Satisfactory yields are obtained already at about 350° C., but the full effect is attained at approximately 400° C., while conversion at such lower temperatures requires several hours. At about 500° C. some minutes suffice as a rule, while at about 600° C. about one minute is the maximum. At temperatures of this order excellent results are attained as a rule with a time of reaction amounting to some seconds. Generally spoken, the period of operation may be the shorter, the higher the temperature above 300° C.

The pressure, which may amount to and even exceed 300 atmospheres, is of minor influence on the conversion than the variation of temperature.

The values of the time of conversion mentioned above apply to catalysts of an activity such as shown by the above mentioned molybdenum or tungsten catalysts which are insensitive to sulfur poisoning. The time of reaction is however shortened if starting materials are used which are altogether free from or contain only very small quantities of sulfur, and if catalysts such as cobalt, nickel or iron compounds are used, which are sensitive to sulfur, but are more active. When less active or no catalysts are used, the time of reaction must be extended correspondingly in order to secure the maximum yield. As a rule the reaction is not allowed to proceed long enough to cause, under the conditions of pressure and temperature used, a substantial decomposition of the material with formation of coke.

We have further found that it is possible to influence the properties of the liquid fuel obtained in the process by limiting the reaction mixture to a predetermined percentage of hydrogen. We are thus enabled to influence for instance the knocking-proofness and the boiling points of the products.

For instance when operating with low boiling tar oils not very poor in hydrogen, for instance oils boiling up to 350° C., less benzine is required than if operating with high boiling tar oil fractions poor in hydrogen or with coal containing still less hydrogen. We so choose the mixture that we obtain a final product having a predetermined percentage of hydrogen, for instance 14%, in order to obtain a final product constituting a fuel of practically the same properties. If it is desired to produce final products richer in hydrogen, we employ a larger proportion of benzines rich in hydrogen, and vice versa.

We may also add to the reaction mixtures small quantities of hydrogen gas, gas mixtures containing same or other carrier gases so that the hydrogen present amounts to about 3 per cent calculated on the hydrocarbon material poor in hydrogen. We may for instance add gas mixtures rich in hydrogen and poor in nitrogen such as coke oven gas or the gaseous products rich in hydrogen which are obtained in the thermal conversion of hydrocarbons, after the valuable hydrocarbons such acetylene have been extracted. We may also add the gas containing hydrogen which remains over after separation of the ethylene and ethane and their homologues, when reacting the waste gases from the synthetic production of benzine from CO and $H_2$ at ordinary pressure. As a carrier gas for the carrying away of the benzine vapors resulting in the reaction, we may for instance use nitrogen gas.

In practising our invention we may for instance proceed as follows, reference being had to the accompanying flow sheet which illustrates the two examples hereunder specified:

Example 1.—In the fractionating apparatus 2, shown in Fig. 1 of the flow sheet, a mixture of hydrocarbons resulting in the hydrogenation of oxides of carbon (CO or $CO_2$) fed in through the pipe 1 are subjected to fractional distillation, and the fractions passing over up to a temperature of about 110° C. pass through the pipe 3 into a condenser 4 to be there condensed. The fractions boiling above 110° are passed through pipe 5 into the autoclave 6, while about 20% tar, calculated on the weight of the reaction mixture, are fed in through pipe 7. The reaction mixture is subjected in the autoclave at a temperature of 430 to 450° C. to a pressure of about 60 atmospheres, the period of reaction varying between a few minutes and several hours. After the reaction has come to an end, the reaction mixture is tapped through the pipe 8 and passed into a second fractionating column 9, from which the liquid hydrocarbons suitable for use as liquid fuel for engines pass through pipe 10 into a condenser 11, from which they are tapped at 12, while the gases, which were not condensed, escape at 13. The residual constituents boiling above about 200° C., which consist of high boiling oils, may be returned through pipes 14 and 5 into the autoclave 6 or, alternatively, into the fractionating vessel 2, to be treated once more with the products, rich in hydrogen, resulting from the hydrogenation of CO or $CO_2$.

The yield, calculated on the hydrocarbons in the starting mixture, will be up to 25% gaseous products, at least 50% knocking-proof liquid fuel having an octane value up to 75, the balance being heavier oils and small proportions of asphalt.

Example 2.—Into a high pressure vessel 15, shown in Fig. 2, is forced through pipe 16 a mixture of 10 parts by weight finely powdered coal extract and 90 parts benzine boiling above 200° C. and of 0.760 specific gravity, obtained by catalytic hydrogenation of CO and $H_2$, 5% sulfide of molybdenum being added.

The coal extract is a product merely consisting of the bituminous constituents of coal and being free from the mineral constituents of the coal, this extract being obtained by extracting coal for instance with high-boiling tar oils under the action of heat and pressure.

The temperature in the high pressure vessel is maintained at 480 to 500° C., the pressure at about 80 atmospheres. After the reaction mixture has been relieved of the pressure thereon and the gas formed and dissolved in the oil has been removed through pipe 17, by expansion, by suction and/or by heating to leave in the oil for instance up to 3% butane+butylene and up to 1% propane+propylene, the oil mixture, which shows a green fluorescence, is passed through pipe 18 into the fractionating column 19 to be there subjected to distillation. The benzine passing over below 200° C. has an octane value of about 70, in contradistinction to the benzine recovered from the hydrocarbons, rich in hydrogen, produced in the hydrogenation of carbon monoxide, however without the addition of a coal extract, which only had an octane value of 63. The benzine gases and vapors are passed through pipe 20 into a condenser 21, from which the non-condensed gases escape at 22, while the condensed liquid hydrocarbons are tapped at 23. The fractions boiling above 200° C. are returned through pipe 24 into the pipe 16, where they are mixed with fresh starting material and returned in a closed cycle into the autoclave 15.

When the catalyst is spent, it is separated from the oil by filtration together with the non-converted parts of the coal extract and the catalyst is then treated for regeneration.

Various changes may be made in the details disclosed in the foregoing specification without departing from the invention or sacrificing the advantages thereof.

We claim:

The process of producing knocking-proof liquid fuel which comprises mixing hydrocarbons rich in hydrogen, produced by hydrogenating an oxide of carbon under substantially normal pressure, with a smaller quantity of a coal extract which is substantially free from ashes and materially less rich in hydrogen than said hydrocarbons, and subjecting the mixture at a temperature ranging between 300 and 700° C. to a heat treatment under a pressure not substantially below 60 atmospheres.

FRIEDRICH MARTIN.
HEINRICH TRAMM.